UNITED STATES PATENT OFFICE.

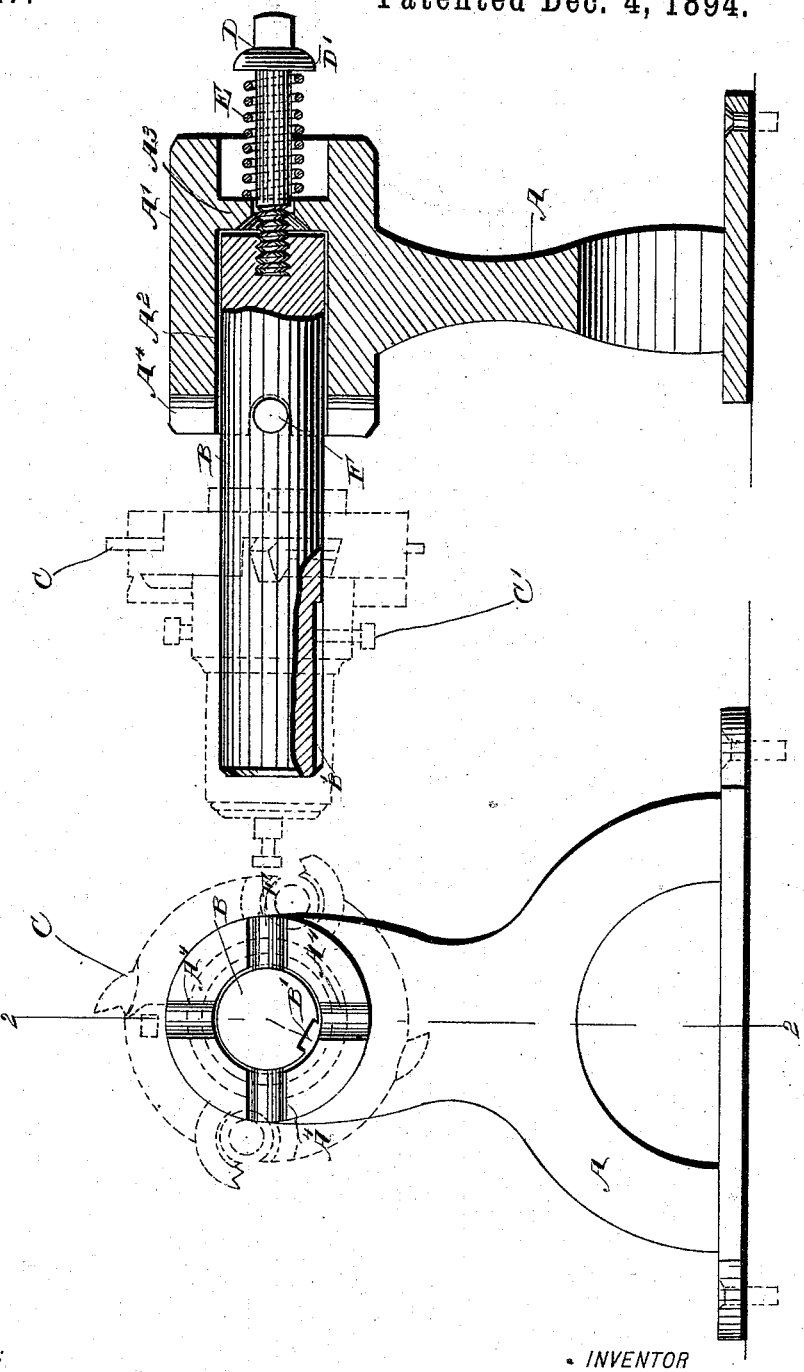

ANDREW KENDIG, OF TEXARKANA, TEXAS, ASSIGNOR TO HIMSELF AND JOHN W. KENDIG, OF SAME PLACE.

SUPPORT FOR CUTTER-HEADS.

SPECIFICATION forming part of Letters Patent No. 530,427, dated December 4, 1894.

Application filed July 7, 1894. Serial No. 516,835. (No model.)

*To all whom it may concern:*

Be it known that I, ANDREW KENDIG, of Texarkana, in the county of Bowie and State of Texas, have invented a new and Improved Support for Cutter-Heads, of which the following is a full, clear, and exact description.

The invention relates to tools for wood working machinery, and its object is to provide a new and improved support for properly holding cutter-heads for planing and other machines, to permit the operator to conveniently sharpen, dress, or otherwise treat the bits or cutters of the head.

The invention consists principally of a spindle mounted to turn and to slide in a bearing, and adapted to support a cutter-head, a pin held transversely in the said spindle and adapted to be seated in grooves in the bearings, and a spring-pressed bolt connected with the rear end of the said spindle, to hold the latter in an innermost position and with the pin in engagement with one of the said grooves.

The invention also consists in certain parts and details, and combinations of the same, as will be hereinafter fully described and then pointed out in the claims.

Reference is to be had to the accompanying drawings, forming part of this specification, in which similar letters of reference indicate corresponding parts in both the views.

Figure 1 is an end view of the improvement; and Fig. 2 is a sectional side elevation of the same, on the line 2—2 of Fig. 1.

The improved support is provided with a suitably constructed stand A, adapted to be attached at its foot to a bench or other suitable base. On the stand A is arranged a bearing A', formed with a longitudinally-extending bore $A^2$, having a transversely apertured partition $A^3$, as plainly illustrated in Fig. 2. In the front end of the bore $A^2$ is fitted a spindle B, adapted to turn and to slide in the said bore with its rear end, the front or outer end of the spindle being adapted to receive the cutter-head C, fastened in place on the spindle by the usual set screws C', engaging a longitudinally-extending groove B' in the outer end of the said spindle B. It is understood that the set screw C' is the one used on the cutter-head, for fastening the latter to the spindle of the planing or other machine.

Into the rear end of the spindle B screws a bolt D, extending through the aperture in the transverse partition $A^3$ and carrying at its rear end a spring E resting with its inner end on the partition $A^3$, and with its outer end on a collar or head D' on the bolt D. The spring E serves to hold the spindle B in an innermost position, so that its inner end rests against the partition $A^3$. See Fig. 2. A pin F is arranged transversely in the spindle B, and is adapted to engage with its projecting ends radially-extending grooves $A^4$ arranged in the front end of the bearing A'. The spindle B is prevented from turning by this pin F, so that the cutter-head C is held in the proper position while one of the cutters or bits is sharpened, dressed, or otherwise treated. When this is done, and it is desired to turn the cutter-head to bring another bit or cutter in a proper position for the operator to work on, then the operator pulls on the cutter-head so as to impart an outward sliding motion to the spindle B, to disengage the pin F from its grooves $A^4$, to permit the operator to turn the spindle B until the pin F snaps into the next set of grooves $A^4$, to again lock the spindle B in place, at the same time bringing the bit or cutter of the head C in proper position.

It is understood that when the operator pulls the spindle B outward the spring E is compressed, so that when the spindle is turned as described, and its pin moves in alignment with the next set of grooves $A^4$, then the tension of the spring E forces the spindle B rearward, to cause the pin F to engage the corresponding grooves $A^4$. This operation is repeated until all the cutters on the head C are treated as desired.

It will be seen that by the device described, the cutter-head can be readily fastened in position on the spindle B, and its several bits or cutters treated for sharpening or other purposes.

Having thus described my invention, I claim as new and desire to secure by Letters Patent—

1. A support for cutter-heads, comprising a spindle mounted to turn and to slide in a fixed bearing, and adapted to support a cutter head, a pin held transversely in the spindle and adapted to be seated in grooves in the said bearing, and a spring-pressed bolt connected with the rear end of the said spindle, to hold the latter in an innermost position and with the pin in engagement with one of the said grooves, substantially as shown and described.

2. A tool support, comprising a stationary bearing having radial grooves at one end and an aperture at the other end, a tool carrying spindle fitting in the said bearing and provided at its end within the bearing with a reduced and headed extension projecting through the aperture in the end of the bearing, and with a transverse pin a short distance from said end, and a spring surrounding the extension, substantially as described.

3. A support for cutter-heads, comprising a stand having a bearing formed with a longitudinal bore, and a transverse partition therein, the front end of the said bearing being provided with radial grooves, a spindle fitted to turn and to slide in the front end of the said bore, and adapted to support a cutter-head, a pin held transversely in the spindle and adapted to be seated in the grooves of the said bearing, a bolt secured to the rear end of the spindle and extending through an aperture in the said transverse partition, and a spring coiled on the said bolt and resting with one end on the said partition and at its outer end on the head of the bolt, substantially as shown and described.

ANDREW KENDIG.

Witnesses:
R. W. RODGERS,
JOHN W. KENDIG.